United States Patent
Kwan et al.

(10) Patent No.: US 8,493,049 B2
(45) Date of Patent: Jul. 23, 2013

(54) CONVERTER WITH CROSSOVER FREQUENCY RESPONSIVE TO SWITCHING FREQUENCY

(75) Inventors: Kai Kwan, Tustin, CA (US); Peter Kim, Huntington Beach, CA (US)

(73) Assignee: Microsemi Corporation, Aliso Viejo, CA (US)

( * ) Notice: Subject to any disclaimer, the term of this patent is extended or adjusted under 35 U.S.C. 154(b) by 445 days.

(21) Appl. No.: 12/960,505

(22) Filed: Dec. 5, 2010

(65) Prior Publication Data

US 2011/0148381 A1 Jun. 23, 2011

Related U.S. Application Data

(60) Provisional application No. 61/288,298, filed on Dec. 20, 2009.

(51) Int. Cl.
*G05F 1/40* (2006.01)
(52) U.S. Cl.
USPC .......................................... 323/285; 323/271
(58) Field of Classification Search
USPC .................. 323/222, 225, 268, 271, 282, 285
See application file for complete search history.

(56) References Cited

U.S. PATENT DOCUMENTS

| | | | |
|---|---|---|---|
| 3,675,159 A | 7/1972 | Judd et al. | |
| 3,989,995 A | 11/1976 | Peterson | |
| 6,420,857 B2 | 7/2002 | Fukui | |
| 7,002,403 B2 | 2/2006 | Marholev | |
| 7,019,504 B2 | 3/2006 | Pullen et al. | |
| 7,196,580 B2 | 3/2007 | Ryoo et al. | |
| 7,265,528 B2 * | 9/2007 | Kotani et al. | 323/285 |
| 7,271,754 B2 | 9/2007 | Maksimovic et al. | |
| 7,298,124 B2 * | 11/2007 | Kan et al. | 323/283 |
| 7,456,618 B2 | 11/2008 | Jain et al. | |
| 2007/0103136 A1 | 5/2007 | Jain | |
| 2008/0089101 A1 | 4/2008 | Schuellein | |
| 2008/0157742 A1 | 7/2008 | Martin et al. | |
| 2008/0157743 A1 | 7/2008 | Martin et al. | |
| 2009/0200996 A1 | 8/2009 | Ojanen et al. | |
| 2010/0164391 A1 * | 7/2010 | Bea et al. | 315/224 |

FOREIGN PATENT DOCUMENTS

EP 1892829 A1 2/2008

OTHER PUBLICATIONS

International Search Report for Parallel PCT/US2010/059007 mailed Sep. 14, 2011 by European Patent Office.
Written Opinion of the International Searching Authority mailed Sep. 14, 2011 by European Patent Office.
Tucker, John; Continuous Tracking Challenges DC-DC Converters; Power Electronics Technology, pp. 57-59, Feb. 2005, New York, NY.

(Continued)

*Primary Examiner* — Matthew Nguyen
(74) *Attorney, Agent, or Firm* — Simon Kahn

(57) ABSTRACT

A power converter constituted of: a reference source; a clock generator exhibiting a variable frequency output, the value of the frequency of the variable frequency output responsive to an external resistor value; and an error amplifier in communication with the reference source, the error amplifier exhibiting a gain whose value is responsive to the external resistor value. Preferably the error amplifier is a transconductance amplifier. In one embodiment the power converter further exhibits a current squarer, arranged to produce a squared value of a current whose value is responsive to the external resistor and provide the squared value to the transconductance amplifier.

17 Claims, 5 Drawing Sheets

OTHER PUBLICATIONS

Naderi, A; Khoei, A.; Hadidi, Kh.; High Speed, Low Power Four-Quadrant CMOS Current-Mode Multiplier; 14th IEEE International Conference on Electronics, Circuits and Systems, 2007, pp. 1308-1311; Institute of Electrical and Electronics Engineers, New York, NY.

Hartman, Mark; Inside Current—Mode Control; Power Designer No. 106, National Semiconductor, 2005; pp. 1-8; Santa Clara, California.

Smith, Nigel; Frequency Compensation in Switching Regulator Design; pp. 33-35, Oct. 2007, Power Systems Design, Annapolis Maryland.

Snelgrove, W. Martin; A Balanced 0.9-um CMOS Transconductance-C Filter Tunable Over the VHF Range; IEEE Journal of Solid State Circuits, vol. 27, Issue 3, Mar. 1992, pp. 314-323; Institute of Electrical and Electronics Engineers, New York, NY.

* cited by examiner

CONVERTER WITH CROSSOVER FREQUENCY RESPONSIVE TO SWITCHING FREQUENCY

CROSS-REFERENCE TO RELATED APPLICATIONS

This application claims priority from U.S. Provisional Patent Application Ser. No. 61/288,298 filed Dec. 20, 2009, the entire contents of which is incorporated herein by reference.

TECHNICAL FIELD

The present application relates to the field of DC/DC converters, and more particularly to a converter whose error amplifier crossover frequency is responsive to changes in the converter switching frequency.

BACKGROUND OF THE INVENTION

A DC/DC power converter receives an input direct current (DC) power, and converts it to a DC output power, typically exhibiting a different voltage than the input DC power. Control of the DC output power may be responsive to the output voltage or to the output current.

A boost converter, also known as a step-up converter, is a power converter with an output DC voltage greater than its input DC voltage. It is a class of switching-mode power supply containing at least a first electronically controlled switch, e.g. a transistor, at least a first energy storage element, e.g. an inductor, and an additional element such as a diode or a second electronically controlled switch. Typically, the first electronically controlled switch and diode, or second electronically controlled switch, are arranged between the inductor and the output, with current being alternately drawn to charge the inductor responsive to the first electronically controlled switch being closed, and passed to a load responsive to the first electronically controlled switch being open. The current goes through the diode or the second electronically controlled switch when it is passed to the load.

A buck converter, also known as a step-down converter, is a power converter with an output DC voltage less than its input DC voltage. It is a class of switching-mode power supply containing at least a third electronically controlled switch, e.g. a transistor, at least a second energy storage element, e.g. an inductor, and an additional element such as a diode or a fourth electronically controlled switch. Typically, the third electronically controlled switch and diode, or fourth electronically controlled switch, are arranged between the input DC power source and the inductor, with current being alternately drawn to charge the inductor through a load responsive to the third electronically controlled switch being closed, and continued to the load discharging the inductor responsive to the third electronically controlled switch being open. The diode or the fourth electronically controlled switch is in series with the inductor when the inductor is discharging to the load.

A classical or a cascaded buck-boost converter is a power converter with an output DC voltage which can be greater than or less than the input DC voltage. It is a class of switching-mode power supply containing at least two electronically controlled switches, at least one energy storage element, e.g. an inductor, and additional elements such as diodes and/or additional electronically controlled switches. Typically, each terminal of the inductor is coupled to at least one electronically controlled switch. The first electronically controlled switch, and optionally the second electronically controlled switch are controlled at either a fixed, or at a variable, switching frequency.

A flyback converter is a buck-boost converter with the inductor, acting as the energy storage element, split to form a transformer, so that the voltage ratios are multiplied with an additional advantage of isolation.

The above listing of power converters is meant to be illustrative of a number of topologies, however this is not meant to be limiting in any way.

Each of the DC/DC power converters is typically supplied with a feedback loop comprising an error amplifier so as to control either the output voltage or the output current to be maintained at a desired value, and at least one of the electronically controlled switches are controlled at either a fixed, or variable, switching frequency responsive to the error amplifier. In order to ensure stability in face of the feedback loop, the zero-crossing frequency, also known as the crossover frequency, of the error amplifier in open loop is typically set to be about 20-25% of the switching frequency. The term crossover frequency is meant to mean the frequency at which the error amplifier begins to exhibit a gain of less than 0 dB.

Many power converters provide the user with a settable switching frequency, typically by the selection of an external component value such as a resistor. The crossover frequency is typically fixed, and thus in order to ensure stability must be set at about 20-25% of the lowest switching frequency allowed. This is however disadvantageous, since in the event that the user has selected, by means of the external component value, a switching frequency in excess of the lowest switching frequency allowed, a higher crossover frequency which allows for a faster loop response time, thus providing faster recovery from changes in the input voltage or output load, provided that stability is ensured, can not be achieved. Thus, irrespective of the user selected switching frequency, the prior art typically supplies fixed crossover frequency.

SUMMARY

Accordingly, it is a principal object of the present embodiments to overcome at least some of the disadvantages of the prior art. This is provided in certain embodiments by an arrangement in which the gain of an error amplifier of a power converter is controlled responsive to the power converter switching frequency. Changing the gain of the error amplifier results in a change in the crossover frequency. In an exemplary embodiment the error amplifier is a transconductance amplifier, whose transconductance is set to be linearly proportional to the power converter switching frequency.

Advantageously, a single terminal of the power converter thus controls the switching frequency, error amplifier gain and resultant crossover frequency of the error amplifier associated with the feedback loop.

Certain embodiments provide for a power converter comprising: a reference source; a clock generator exhibiting a variable frequency output, the value of the frequency of the variable frequency output responsive to an input signal; and an error amplifier in communication with the reference source, the error amplifier exhibiting a gain whose value is responsive to the input signal.

In one further embodiment the error amplifier is further in communication with an output sample of the power converter. In another further embodiment the value of the frequency of the variable frequency output is proportional to the value of the input signal. In yet another further embodiment the value of the input signal is determined responsive to the value of a component attached to a terminal of the power converter.

In one further embodiment the value of the frequency of the variable frequency output is linearly proportional to the value of the input signal. In another further embodiment the error amplifier is constituted of a transconductance amplifier.

In one yet further embodiment the power converter further comprises a current squarer, the current squarer arranged to produce a squared value of the input signal and provide the squared value to the transconductance amplifier. In another yet further embodiment the gain is proportional to the value of the input signal. In yet another further embodiment the gain is linearly proportional to the value of the input signal.

Independently, certain embodiments provide for a method of controlling a power converter such that the crossover frequency of a feedback error amplifier is responsive to the switching frequency, the method comprising: receiving an input signal; generating a variable frequency clock output, the value of the frequency of the generated clock output being responsive to the received input signal; providing an error amplifier, the provided error amplifier forming a feedback circuit; and controlling the gain of the provided error amplifier to be responsive to the input signal.

In one further embodiment the value of the frequency of the generated clock output is proportional to the value of the input signal. In another further embodiment the value of the frequency of the generated clock output is linearly proportional to the value of the input signal. In yet another further embodiment the provided error amplifier is a transconductance amplifier. In yet another further embodiment the method further comprises providing a component external to the power converter, wherein the value of the received input signal is determined responsive to the value of the provided component In one further embodiment the method further comprises: producing a squared value of the input signal; and providing the squared value to the error amplifier, wherein the gain is responsive to the provided squared value. In one yet further embodiment the gain is proportional to the value of the input signal. In another yet further embodiment the gain is linearly proportional to the value of the input signal.

Independently certain embodiments provide for a power converter comprising: a clock generator exhibiting a variable frequency output, the value of the frequency of the variable frequency output responsive to an input signal; a means for receiving an indication of one of output voltage and current of the power converter; and an error amplifier in communication with the means for receiving an indication of one of output voltage and current of the power converter, the error amplifier exhibiting a gain whose value is responsive to the input signal.

In one further embodiment the error amplifier is constituted of a transconductance amplifier. In another further embodiment the gain is linearly proportional to the value of the input signal.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1A:
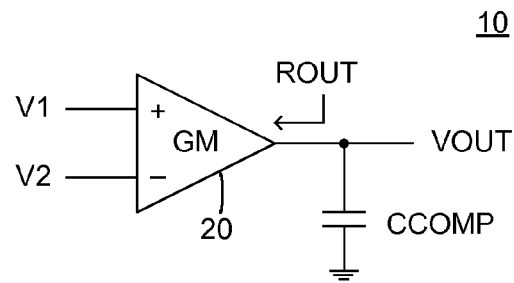
FIG. 1A illustrates a high level schematic diagram of a transconductance-C structure in accordance with the prior art.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The invention is herein described in relation to a buck converter, however this is not meant to be limiting in any way. The teaching of the invention is equally applicable to any power converter configuration having a feedback loop, including, without limitation, a boost converter and a flyback converter.

FIG. 1A illustrates a high level schematic diagram of a transconductance-C structure 10, in accordance with the prior art, comprising: a transconductance amplifier 20, exhibiting a transconductance GM; and a capacitor denoted CCOMP. The output resistance of transconductance amplifier 20 is shown, denoted ROUT. The non-inverting input of transconductance amplifier 20 is connected to a first voltage V1 and the inverting input of transconductance amplifier 20 is connected to a second voltage V2. The output of transconductance amplifier 20 is connected to a first end of capacitor CCOMP and is denoted VOUT. The second end of capacitor CCOMP is connected to a common point, in one embodiment the common point being ground. The value of capacitor CCOMP includes all stray capacitances as well as an actual capacitor, if installed.

Figure 1B:
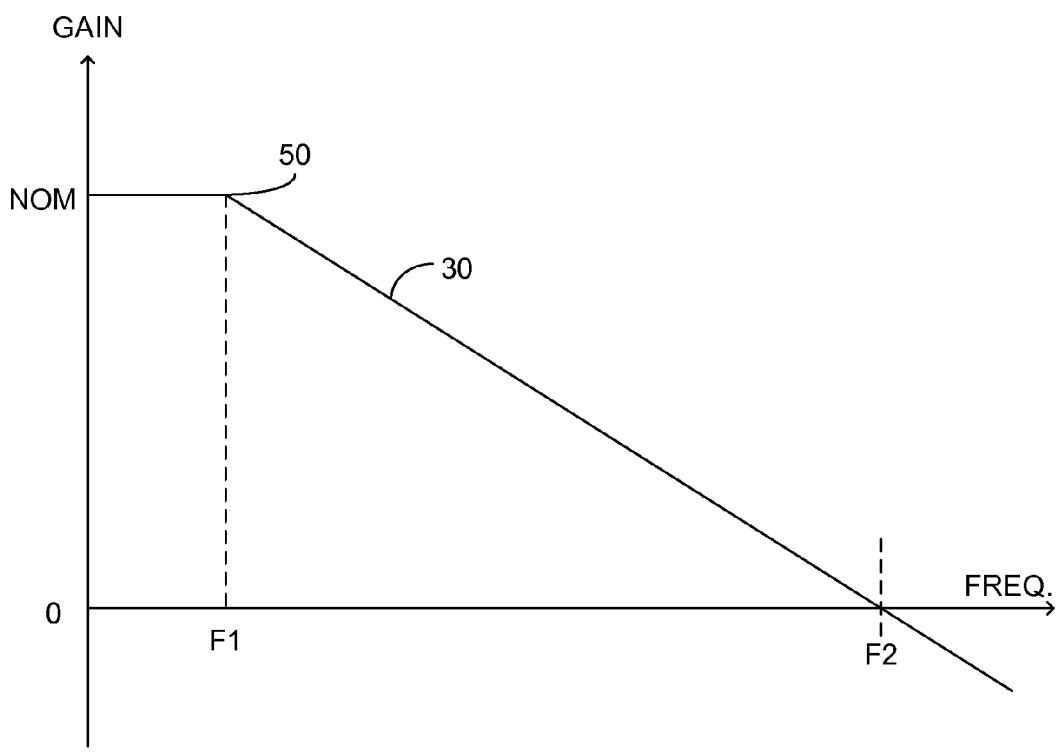
FIG. 1B illustrates a graph of the AC response of the transconductance-C structure of FIG. 1A.

FIG. 1B illustrates a graph showing the AC response of transconductance-C structure 10 of FIG. 1A, where the x-axis represents frequency and the y-axis represent gain, measured in decibels (dB). Curve 30 represents the gain of transconductance-C structure 10 of FIG. 1A, measured at output VOUT. Curve 30 shows a nominal gain, denoted NOM, for frequencies up to an inflection point 50, at a frequency denoted F1. For the sake of simplicity FIGS. 1A and 1B will be described together.

Curve 30, and particularly the nominal gain NOM, is dependant on ROUT and the value of GM of transconductance amplifier 20, specifically being:

$$NOM = ROUT*GM \quad \text{EQ. 1}$$

assuming ROUT>>1. Inflection frequency F1 is given as:

$$F1 = \frac{1}{ROUT*CCOMP} \quad \text{EQ. 2}$$

The crossover frequency of curve 30, denoted F2, is thus dependant on the value of capacitor CCOMP and on the value of GM of transconductance amplifier 20, specifically:

$$F2 = \frac{GM}{CCOMP} \quad \text{EQ. 3}$$

It is thus shown that crossover frequency F2 of transconductance-C structure 10 is linearly proportional to the value GM of transconductance amplifier 20 for a fixed value of CCOMP.

Figure 2A:
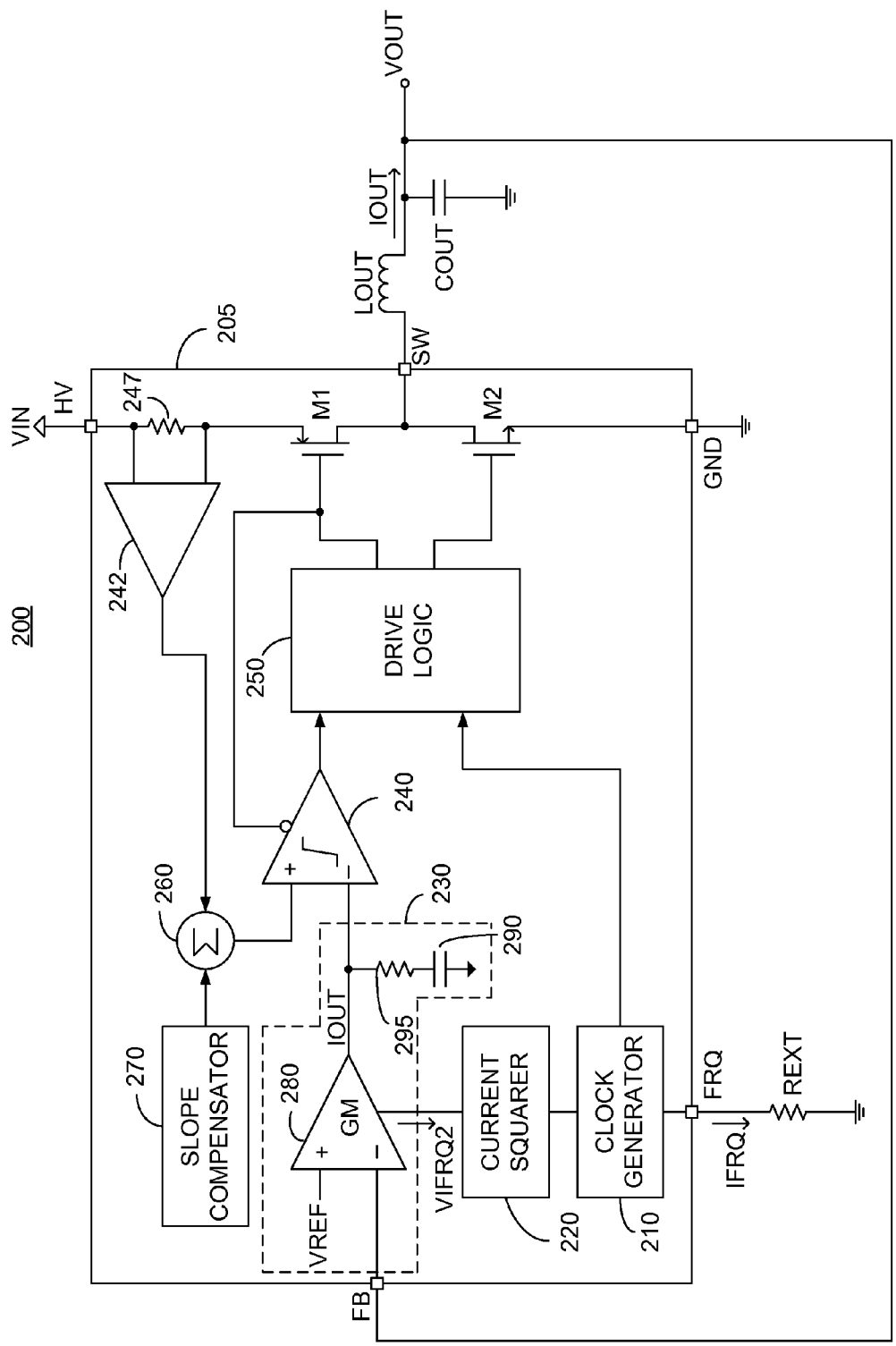
FIG. 2A illustrates a high level schematic diagram of a power converter wherein the crossover frequency of a feedback error amplifier is responsive to the switching frequency.

FIG. 2A illustrates a high level schematic diagram of a power converter 200, exhibiting a switching frequency, denoted FSW, and comprising: a converting unit 205, exhibiting a plurality of ports denoted HV, FB, GND, SW and FRQ, respectively; an inductor denoted LOUT; an output capacitor denoted COUT; and an external resistor, denoted REXT. Converting unit 205 comprises: a clock generator 210; a current squarer 220; a transconductance structure 230; a comparator 240; a drive logic circuitry 250; a summing circuit 260; a slope compensator 270; a first electronically controlled switch, denoted M1; a second electronically controlled switch, denoted M2; a sense resistor 247 and a differential amplifier 242. Transconductance structure 230 comprises: an error amplifier 280; a capacitor 290; and a resistor 295. Error amplifier 280 is in one exemplary embodiment a transconductance amplifier exhibiting a transconductance, denoted GM. First electronically controlled switch M1 is in one exemplary embodiment a P-channel metal-oxide-semiconductor field-effect transistor (PMOSFET) and second electronically controlled switch M2 is in one exemplary embodiment an N-channel metal-oxide-semiconductor field-effect transistor (NMOSFET).

A first end of external resistor REXT is connected to a first common point, in one particular embodiment the first common point being ground, and the second end of external resistor REXT is connected via port FRQ to an input of clock generator 210. A first output of clock generator 210 is connected to a respective input of drive logic circuitry 250 and a second output of clock generator 210 is connected to an input of current squarer 220. The output of current squarer 220 is connected to transconductance structure 230, and in particular to a bias input of error amplifier 280. The non-inverting input of error amplifier 280 is connected to a reference voltage, denoted VREF. The inverting input of error amplifier 280 is connected to port FB. The output of error amplifier 280, denoted IOUT, is connected to a first end of resistor 295 and to the inverting input of comparator 240. The second end of resistor 295 is connected to a first end of capacitor 290 and the second end of capacitor 290 is connected to a second common point, which in one particular embodiment represents an internal ground. The non-inverting input of comparator 240 is connected to the output of summing circuit 260 and the output of comparator 240 is connected to a respective input of drive logic circuitry 250. A first output of drive logic circuitry 250 is connected to the gate of first electronically controlled switch M1 and to the enable input of comparator 240, which is arranged to be an active low input. A second output of drive logic circuitry 250 is connected to the gate of second electronically controlled switch M2. The source of first electronically controlled switch M1 is connected via sense resistor 247 to port HV, and port HV is connected to an input voltage, denoted VIN. The drain of first electronically controlled switch M1 is connected to the drain of second electronically controlled switch M2 and via port SW to a first end of inductor LOUT. Each end of sense resistor 247 is connected to a respective input of differential amplifier 242, and the output of differential amplifier 242 is connected to a first input of summing circuit 260. Slope compensator 270 is connected to a second input of summing circuit 260. The source of second electronically controlled switch M2 is connected via port GND to the first common point. The second end of inductor LOUT is connected to a first end of output capacitor COUT and to port FB, and is denoted VOUT. The second end of output capacitor COUT is connected to the first common point.

Figure 2B:
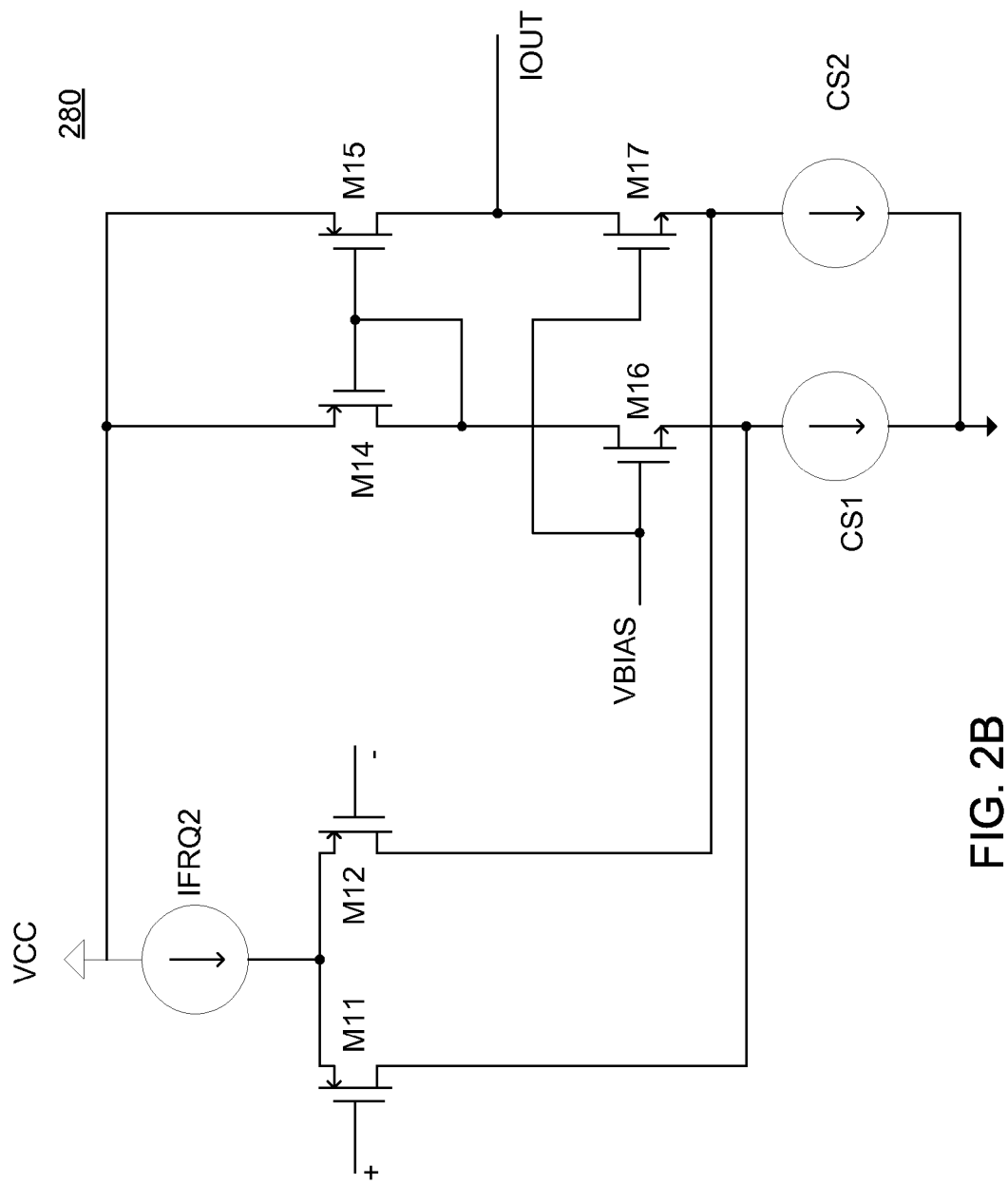
FIG. 2B illustrates a high level schematic diagram of a transconductance error amplifier according to an exemplary embodiment.

FIG. 2B illustrates a high level schematic diagram of an exemplary embodiment of error amplifier 280 of FIG. 2A, comprising a first NMOSFET M11, a second NMOSFET M12, a third NMOSFET M14, a fourth NMOSFET M15, a first PMOSFET M16, a second PMOSFET M17, a first current source IFRQ2, a second current source CS1 and a third current source CS2. The inverting and non-inverting inputs are shown, as well as the output, denoted IOUT, as described above in relation to FIG. 2A. A first end of first current source IFRQ2 is connected to a voltage source, denoted VCC, and a second end of first current source IFRQ2 is connected to each of the sources of first and second NMOSFET M11 and M12. The gate of first NMOSFET M11 represents the non-inverting input of error amplifier 280 and the gate of second NMOSFET M12 represents the inverting input of error amplifier 280. The drain of first NMOSFET M11 is connected to the source of first PMOSFET M16 and to a first end of second current source CS1. The drain of second NMOSFET M12 is connected to the source of second PMOSFET M17 and to a first end of third current source CS2. The second end of second current source CS1 and the second end of third current source CS2 are connected to the second common point, which in one particular embodiment represents an internal ground.

The source of third NMOSFET M14 and the source of fourth NMOSFET M15 are each connected to VCC, and the gate of third NMOSFET M14 is connect to the gate of fourth NMOSFET M15 and to the drain of third NMOSFET M14 and the drain of first PMOSFET M16. The drain of fourth NMOSFET M15 represents output IOUT, and is further connected to the drain of second PMOSFET M17. The gate of first PMOSFET M16 and the gate of second PMOSFET M17 are connected to a common voltage bias point, denoted VBIAS.

For ease of understanding, the operation of FIGS. 2A and 2B will be taken together. A current, denoted IFRQ, is driven through external resistor REXT, the current defined responsive to a reference voltage to be described further hereinto below in relation to FIG. 3 and the value of external resistor REXT, switching frequency FSW being linearly proportional to the value of current IFRQ. Current IFRQ flows through clock generator 210 thereby enabling clock generator 210 to generate a clock signal to be output to drive logic circuitry 250.

Current IFRQ flows through current squarer 220 where it is squared to a value denoted IFRQ2. The construction and operation of current squarer 220 is known to those skilled in the art, and an exemplary embodiment is described in detail, inter alia, in an article by A. Naderi et al., published by the Institute of Electrical and Electronics Engineers (IEEE) of New York, entitled "High speed, Low power Four-Quadrant CMOS Current-Mode Multiplier", the entire contents of which are incorporated herein by reference. A voltage representation of squared current IFRQ2, denoted VIFRQ2 is received at a bias input of error amplifier 280, shown in FIG. 2B as current source IFRQ2. In an exemplary embodiment a current mirror transfers current IFRQ2 from a transistor in current squarer 220 to a matched transistor in error amplifier 280. Thus, in such an embodiment, a voltage representation of current IFRQ2 is connected between current squarer 220 and error amplifier 280, and the voltage representation is converted to current IFRQ2 within error amplifier 280.

The transconductance, denoted GM, of error amplifier 280 is given as:

$$GM = \sqrt{2*IFRQ2*K} \qquad \text{EQ. 4}$$

with K being the properties of transistors M11 and M12. Since the square root of IFRQ2 is IFRQ, EQ. 4 can now be written as:

$$GM = IFRQ\sqrt{2*K} \qquad \text{EQ. 5}$$

The GM of error amplifier 280 is thus linearly proportional to IFRQ, and since as described above IFRQ is linearly proportional to switching frequency FSW, GM is also linearly proportional to switching frequency FSW.

Transconductance structure 230 implements, responsive to resistor 295 and capacitor 290, type II compensation commonly used in PWM controllers. This compensation effectively counters the low frequency pole created by output capacitor COUT and any output load resistance. The AC response of transconductance structure 230 is thereby similar to the AC response of transconductance-C structure 10. As shown above in relation to EQ. 3 the crossover frequency of transconductance structure 230 is linearly proportional to transconductance GM of error amplifier 280. Since transconductance GM of error amplifier 280 is linearly proportional to switching frequency FSW, the crossover frequency of transconductance structure 230 is thus linearly proportional to switching frequency FSW. Thus, the crossover frequency of transconductance structure 230 changes linearly according to changes in switching frequency FSW. In order to insure stability, the cross-over frequency of transconductance structure 230 is set to about 20-25% of switching frequency FSW by the selection of the value of capacitor 290.

When the output of clock generator 210 goes high, drive logic circuitry 250 is operative to open second electronically controlled switch M2, close first electronically controlled switch M1, and enable comparator 240. Closing first electronically controlled switch M1 connects input voltage VIN to the first end of inductor LOUT, thereby causing a gradual increase of the current running through inductor LOUT, denoted IOUT, according to the equation:

$$\frac{dIOUT}{dt} = \frac{V}{L} \qquad \text{EQ. 6}$$

where V represents the voltage drop across inductor LOUT, and L represents the inductance of inductor LOUT. As IOUT increases the voltage drop across first electronically controlled switch M1 also increases. The voltage sampled at the drain of first electronically controlled switch M1 is summed with the output of slope compensator 270, whose operation and purpose will be described below, by summing circuit 260 and fed into comparator 240. The output of transconductance structure 230 charges capacitor 290 via resistor 295, and resultant voltage at the output of transconductance structure 230 is compared with the output of summing circuit 260 by comparator 240. In the event that the resultant voltage at the output of summing circuit 260 is higher than the voltage output from transconductance structure 230, comparator 240 is operative to cause drive logic circuit 250 to open first electronically controlled switch M1 and close second electronically controlled switch M2, thereby driving the voltage at port SW to ground, and closing the loop allowing inductor LOUT to discharge through the output load (not shown).

It is known to those skilled in the art that a current feedback loop becomes open loop unstable when the duty cycle is raised above 50%. In further detail, for duty cycles lower than 50% there are disturbances from the nominal operating point, however they decrease with every cycle. For duty cycles greater than 50% the disturbances grow with each cycle. By adding slope compensation to the sensed current signal, i.e. adding current to compensate for the disturbance, the duty cycle at which a disturbance begins to grow will increase. The specific construction and operation of slope compensator 270 is known to those skilled in the art. In one particular embodiment, a ramp voltage from clock generator 210 is multiplied by a constant value, and the result is fed as the output of slope compensator 270 to the second input of summing circuit 260.

Figure 3A:
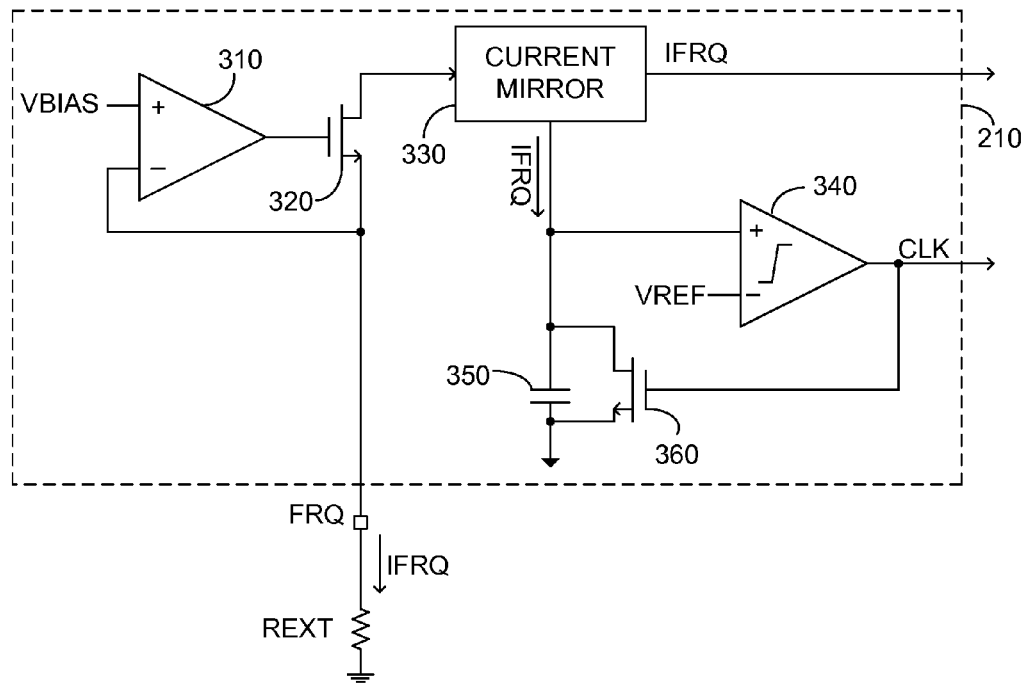
FIG. 3A illustrates a high level schematic diagram of a clock generator of the power converter of FIG. 2 according to an exemplary embodiment.

FIG. 3A illustrates a high level schematic diagram of clock generator 210 with external resistor REXT connected thereto. Clock generator 210 comprises: an op-amp 310; a first electronically controlled switch 320, in one embodiment first electronically controlled switch 320 being an NMOSFET; a current mirror 330; a comparator 340; a capacitor 350; and a second electronically controlled switch 360, in one embodiment second electronically controlled switch 360 being an NMOSFET.

The non-inverting input of op-amp 310 is connected to a bias voltage, denoted VBIAS. In an exemplary embodiment, VBIAS is the same reference voltage described above in relation to FIG. 2B. The inverting input of op-amp 310 is connected to the source of first electronically controlled switch 320 and to a first end of external resistor REXT, via port FRQ. The output of op-amp 310 is connected to the gate of first electronically controlled switch 320. The second end of external resistor REXT is connected to a common point, in one embodiment the common point being ground. The drain of first electronically controlled switch 320 is connected to an input of current mirror 330. A first output of current mirror 330 is connected to the non-inverting input of comparator 340, a first end of capacitor 350, and the drain of second electronically controlled switch 360. A second output of current mirror 320 is output from clock generator 210. The inverting input of comparator 340 is connected to a reference voltage denoted VREF. The output of comparator 340, denoted CLK is connected to the gate of second electronically controlled switch 360 and is further output from clock generator 210, as described above in relation to FIG. 2A. The second end of capacitor 350 is connected to the second common point.

Figure 3B:
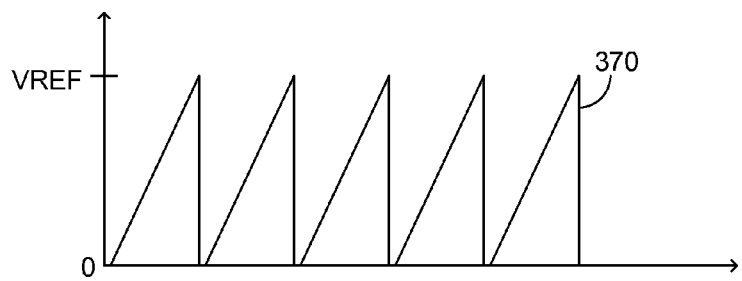
FIG. 3B illustrates a graph of the voltage across an element of the clock generator of FIG. 3A.
Figure 3C:
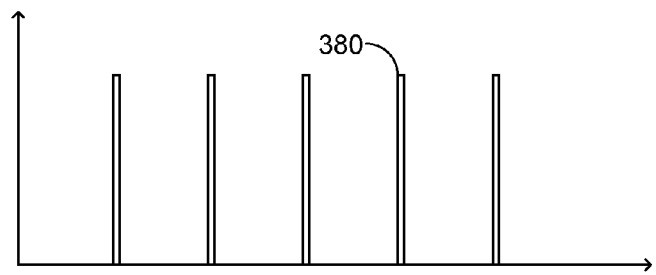
FIG. 3C illustrates a graph of the clock pulse output of the clock generator of FIG. 3A.

FIG. 3B illustrates a graph of the voltage across capacitor 350, denoted VC, where the x-axis represents time and the y-axis represents voltage. Sawtooth waveform 370 represents voltage VC as a function of time. FIG. 3C illustrates a graph of output CLK, where the x-axis represents time and the y-axis represents voltage. Pulse train 380 represents output CLK. For the sake of simplicity FIGS. 3A, 3B and 3C will be described together.

In operation, current IFRQ is driven through REXT, responsive to voltage VBIAS. The value of current IFRQ is responsive to the value of REXT, for any fixed voltage VBIAS. The closed loop operation of op-amp 310, first electronically controlled switch 320, and external resistor REXT causes the voltage at port FRQ to be set to VBIAS, thus current IFRQ is given as:

$$IFRQ = \frac{VBIAS}{REXT} \qquad \text{EQ. 7}$$

Current IFRQ flows into current mirror 330 which is operative to output two currents, each being the same value as IFRQ. A first current IFRQ flows out of clock generator 210 to current squarer 220, as described above in relation to FIG. 2A. The second current IFRQ flows to capacitor 350, thereby charging capacitor 350. Initially, when the voltage across capacitor 350, i.e. voltage VC, is below VREF, the output of comparator 340 is low, thereby opening second electronically controlled switch 360 allowing capacitor 350 to charge. When voltage VC reaches VREF, output CLK of comparator 340 goes high, as shown in FIGS. 3B and 3C, thereby closing second electronically controlled switch 360 thus discharging capacitor 350. The non-inverting input of comparator 340 is then driven to ground, thereby causing output CLK of comparator 340 to go low, as shown in FIG. 3C. Output CLK thus becomes a clock pulse, with the duty rate being defined by the amount of time it takes for voltage VC to reach VREF, as illustrated in FIGS. 3B and 3C. Output CLK is operative to drive logic circuitry 250 and comparator 240, as described above in relation to FIG. 2. The voltage across capacitor 350 is given as:

$$\frac{dVC}{dt} = \frac{IFRQ}{C} \qquad \text{EQ. 8}$$

with C being the capacitance of capacitor 350. The rate of change of voltage VC is thus linearly proportional to the value of current IFRQ, therefore the amount of time it takes voltage VC to reach VREF is also linearly proportional to the value of current IFRQ. The frequency of clock pulse CLK is thus linearly proportional to the value of current IFRQ.

Figure 4:
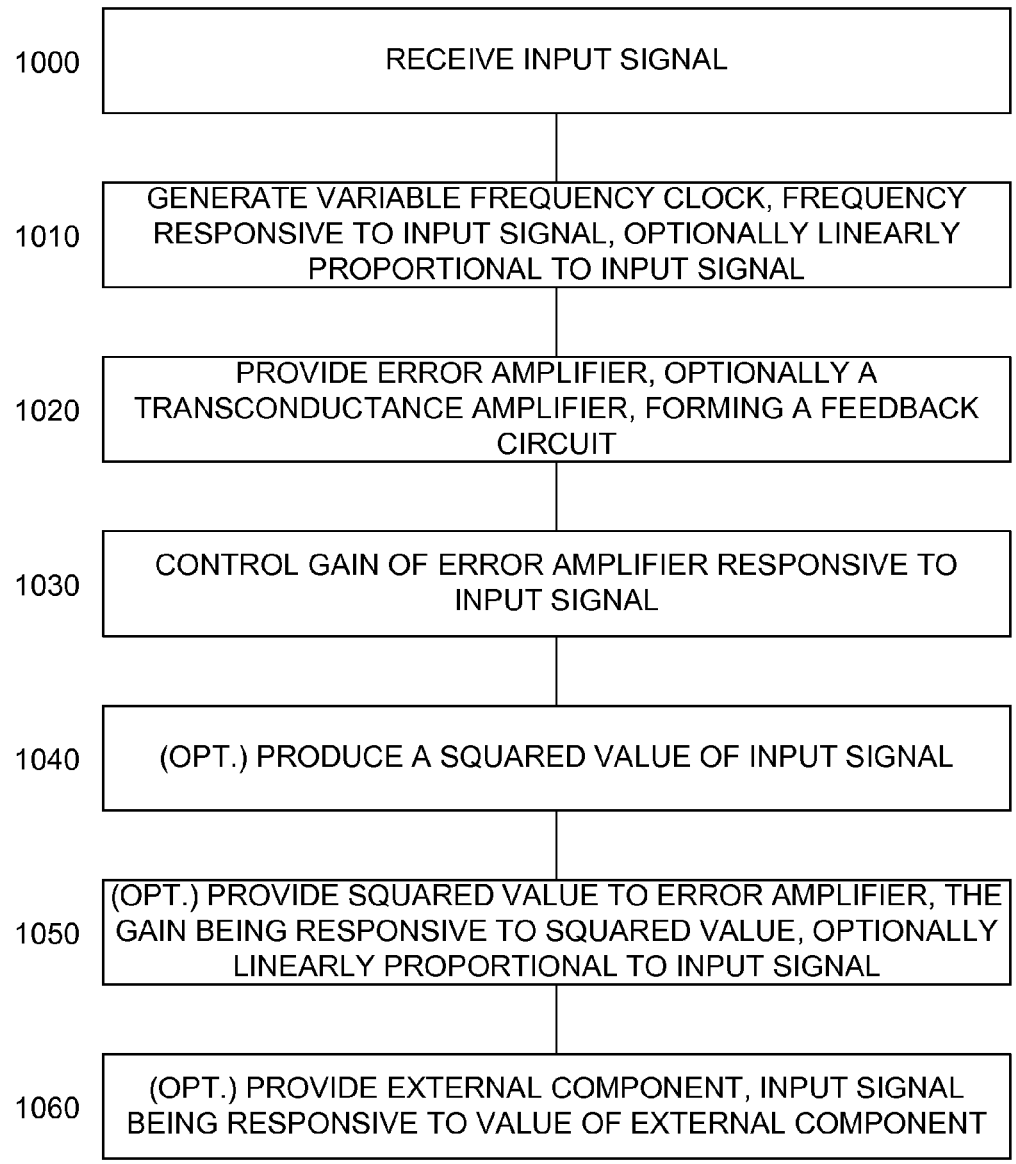
FIG. 4 illustrates a high level flow chart of a method of controlling a power converter such that the crossover frequency of a feedback error amplifier is responsive to the switching frequency.

FIG. 4 is a high level flow chart of a method of controlling a power converter, such as power converter 200 of FIG. 2, such that the crossover frequency of a feedback error amplifier is responsive to the switching frequency. In stage 1000, an input signal, such as current IFRQ, is received at the power converter. In one embodiment, as described above, current IFRQ is received at clock generator 210. In stage 1010, a variable frequency clock output is generated, such as clock pulse CLK of FIGS. 3A-3C, responsive to the received input signal of stage 1000. In one embodiment the variable frequency clock output is generated by clock generator 210. Optionally, the variable frequency clock output is arranged to be proportional to the input signal and is further optionally arranged to be linearly proportional to the input signal, as described above in relation to FIGS. 3A-3C wherein clock pulse CLK is linearly proportional to current IFRQ. In stage 1020, an error amplifier is provided, such as error amplifier 280, forming a feedback circuit for power converter 200. Optionally, the error amplifier is a transconductance amplifier, as described above in relation to FIG. 2. In stage 1030, the gain of the error amplifier of stage 1020 is controlled responsive to the input signal of stage 1000. In one embodiment, as described above, error amplifier 280 is biased responsive to the value of current IFRQ.

In optional stage 1040, a squared value of the input signal of stage 1000, such as current IFRQ2 of FIG. 2, is produced by a current squarer, such as current squarer 220. In optional stage 1050, the produced squared value of stage 1040 is provided to the error amplifier of stage 1020 and the gain of the error amplifier is responsive to the produced squared value. Further optionally, the gain of the error amplifier is proportional to the input signal of stage 1000 and further optionally the gain of the error amplifier is linearly proportional to the input signal. In one embodiment, a voltage representation of current IFRQ2 is provided to the bias input of error amplifier 280, thereby controlling gain GM to be linearly proportional to current IFRQ, as described above in relation to FIG. 2. In optional stage 1060, an external component is provided, such as external resistor REXT, the input signal of stage 1000 being responsive to the value of the external component. In one embodiment, the value of current IFRQ is linearly proportional to the resistance value of external resistor REXT, as described above in relation to FIG. 3A.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

We claim:
1. A power converter comprising:
a converting unit; and
a resistor external of said converting unit,
said converting unit comprising:
a reference source;

a clock generator arranged to output a periodic clocking signal with a frequency determined responsive to the value of said external resistor, said converting unit arranged to convert an input power signal to an output power signal at a switching frequency responsive to said periodic clocking signal; and an error amplifier in communication with said reference source and with an output sample of the power converter, said converting unit arranged to control the output of the power converter responsive to said error amplifier, said error amplifier exhibiting a gain whose value is responsive to the value of said external resistor.

2. The power converter of claim 1, wherein said converting unit further comprises:

a current generator in communication with said external resistor, said current generator arranged to produce a reference current whose value is determined responsive to said external resistor, wherein the value of the frequency of said clock generator is proportional to the value of said produced reference current.

3. The power converter of claim 2, wherein the value of the frequency of said clock generator is linearly proportional to the value of said produced reference current.

4. The power converter of claim 1, wherein said error amplifier is constituted of a transconductance amplifier.

5. The power converter of claim 4, wherein said converting unit further comprises:

a current generator in communication with said external resistor; and a current squarer, said current generator arranged to produce a reference current whose value is determined responsive to said external resistor, said current squarer arranged to produce a squared value of said reference current and provide said squared value to said transconductance amplifier, the gain of said transconductance amplifier responsive to said squared value.

6. The power converter of claim 4, wherein said gain of said transconductance amplifier is proportional to said produced reference current.

7. The power converter of claim 4, wherein said gain of said transconductance amplifier is linearly proportional to said produced reference current.

8. A method of controlling a power converter such that the crossover frequency of a feedback error amplifier is responsive to the switching frequency, the method comprising:

generating a current whose value is responsive to the value of an external resistor;

generating a periodic clocking signal with a frequency determined responsive to the value of said generated current;

converting an input power signal to an output power signal at a switching frequency responsive to said periodic clocking signal;

providing an error amplifier, said provided error amplifier forming a feedback circuit to control said converting so as to converge to a provided reference value; and setting the gain of said provided error amplifier responsive to the value of said generated current.

9. The method of claim 8, wherein the frequency of the generated periodic clocking signal is proportional to the value of said generated current.

10. The method of claim 8, wherein the frequency of the generated periodic clocking signal is linearly proportional to the value of said generated current.

11. The method of claim 8, wherein said provided error amplifier is a transconductance amplifier.

12. The method of claim 8, further comprising:

producing a squared value of said generated current; and providing said squared value to said provided error amplifier, said setting of said gain responsive to said provided squared value.

13. The method of claim 12, wherein said set gain of said error amplifier is proportional to the value of said generated current.

14. The method of claim 12, wherein said set gain of said error amplifier is linearly proportional to the value of said generated current.

15. A power converter comprising:

a clock generator arranged to produce a periodic output signal with a frequency responsive to the value of an external component, the power converter arranged to convert an input power signal to an output power signal at a switching frequency responsive to said periodic clocking signal;

a means for receiving an indication of one of output voltage and current of the power converter; and an error amplifier in communication with said means for receiving an indication of one of output voltage and current of the power converter, said error amplifier exhibiting a gain whose value is responsive to the value of said external component.

16. The power converter of claim 15, wherein said error amplifier is constituted of a transconductance amplifier.

17. The power converter of claim 15, wherein said gain is linearly proportional to the value of said external component.

* * * * *